G. GUNTHER.
Improvement in the Manufacture of Bird-Cages.
No. 127,598. Patented June 4, 1872.
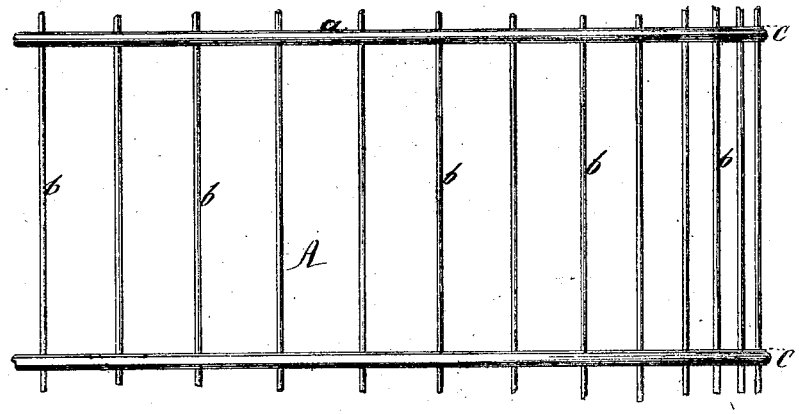
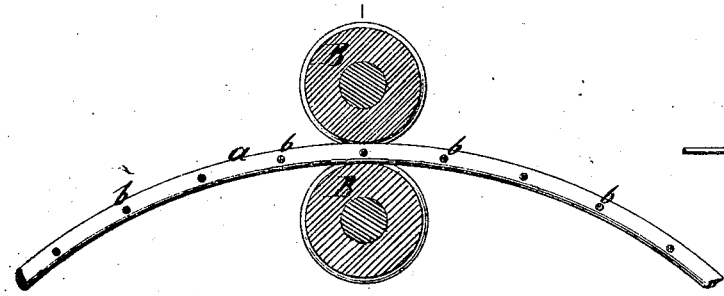
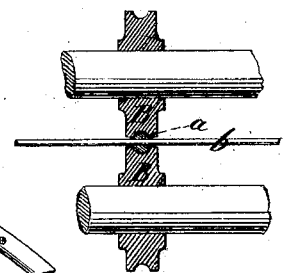
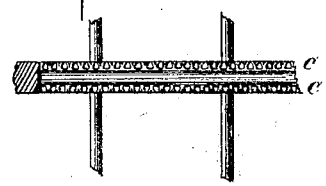
Witnesses:
E. G. Kastenhuber
Ernst Bilhuber
Inventor:
Gottlob Gunther

UNITED STATES PATENT OFFICE.

GOTTLOB GÜNTHER, OF NEW YORK, N. Y.

IMPROVEMENT IN THE MANUFACTURE OF BIRD-CAGES.

Specification forming part of Letters Patent No. 127,598, dated June 4, 1872.

*To all whom it may concern:*

Be it known that I, GOTTLOB GÜNTHER, of the city, county, and State of New York, have invented a new and useful Improvement in the Manufacture of Bird-Cages; and I do hereby declare the following to be a full, clear, and exact description thereof, which will enable those skilled in the art to make and use the same, reference being had to the accompanying drawing forming part of this specification, in which drawing—

Figure 1 represents a side view of my invention. Fig. 2 is a plan of one of the cross-bands, showing the manner in which the same is connected to the upright wires, on a larger scale than the previous figure. Fig. 3 is a transverse section of the same. Fig. 4 is an enlarged view of the inside of the cross-bands when ornamented.

Similar letters indicate corresponding parts.

The invention relates to a bird-cage, the cross-bands of which are perforated with holes for the reception of the upright wires, and then exposed to the action of pressing-rollers, whereby ribs are formed upon the cross-bands which embrace the upright wires, and the perforations are elongated and caused to close up tight upon the upright wires and to retain them firmly in position.

In the drawing, the letter A designates a portion of a bird-cage, which is constructed of cross-bands $a$ and upright wires $b$. The cross-bands are perforated with holes large enough to admit the upright wires, and, after said upright wires have been adjusted in position, the cross-bands are passed through between pressing-rollers B B. (See Figs. 2 and 3.) These pressing-rollers are either plain, or provided with moldings to impart to the cross-bands an ornamental appearance, and by their action have a tendency to elongate the holes in the cross-bands, and cause the same to press against the upright wires on all sides, and thus hold the two firmly together in a secure and substantial manner; but to further secure the parts together, ribs $c$ $c$ are formed upon the cross-bands by the action of the edges of the rollers, so that the said ribs, being thus drawn out, will also nicely and closely surround the upright wires on all sides. At the same time the holes are closed up perfectly tight all round the upright wires, leaving no room for insects or other impurities that might prove injurious to the bird occupying the cage.

It will be readily seen that by this construction of the cage much time and labor are saved, for it requires but a few moments to pass each of the cross-bands through between the pressing-rollers, and thus connect these cross-bands firmly with the upright wires; the cross-bands being formed with ribs $c$ $c$, and also present a somewhat flattened surface, due to the action of the rollers, so that my cage can be readily distinguished in the market from those of other manufacture.

What I claim as new, and desire to secure by Letters Patent, is—

A bird-cage the cross-bands of which are connected to the upright wires by compressing the metal of the cross-bands, and forming the ribs $c$ $c$ to surround the said upright wires, substantially in the manner herein shown and described.

GOTTLOB GÜNTHER.

Witnesses:
W. HAUFF,
E. F. KASTENHUBER.